United States Patent [19]

Kikuchi

[11] 4,036,339
[45] July 19, 1977

[54] TEMPERATURE SENSITIVELY ACTUATED HYDRAULIC COUPLING FOR DRIVING FANS

[75] Inventor: Yasubee Kikuchi, Shuzenjimachi, Japan

[73] Assignee: Usui Kokusai Sangyo Kabushiki Kaisha, Shizuoka, Japan

[21] Appl. No.: 648,134

[22] Filed: Jan. 12, 1976

[30] Foreign Application Priority Data

Feb. 4, 1975 Japan .................... 50-014710

[51] Int. Cl.² .................. F16D 35/00; F16D 43/25
[52] U.S. Cl. ...................... 192/58 B; 192/82 T; 236/88
[58] Field of Search ............... 192/58 B, 82 T; 236/88

[56] References Cited

U.S. PATENT DOCUMENTS

| | | | |
|---|---|---|---|
| 2,339,087 | 1/1944 | Mantz | 236/88 |
| 2,390,985 | 12/1945 | Boyer | 236/88 |
| 3,144,922 | 8/1964 | Weir | 192/82 T X |
| 3,197,003 | 7/1965 | Yetter | 192/82 T |
| 3,339,688 | 9/1967 | Harvey | 192/58 B |

*Primary Examiner* — Allan D. Herrmann
*Attorney, Agent, or Firm* — Anthony J. Casella; Joseph Calvaruso

[57] ABSTRACT

A noise is generated unavoidably owing to hunting phenomenon that appears in process of increasing or decreasing torque to be transmitted by a hydraulic coupling in a hitherto known type, when it is subjected to change of the ambient temperature.

A purpose of this invention is to provide a new and unique hydraulic coupling which enables hydraulic connection to be effected very quickly in such a way that engagement or disengagement between ferrite and magnet is applied to transfer mechanism in hydraulic coupling, depending on the ambient temperature.

The above purpose of the invention has been accomplished as follows.

Magnetical attractive force between ferrite and magnet is predetermined to overcome spring force in a normal temperature, and working temperature for this new mechanism according to the invention is selected around at Curie temperature of said ferrite material. So the magnetically attractive force will decrease abruptly, when the hydraulic coupling is exposed to a temperature higher than said Curie point. On the other hand, when the ferrite is exposed to a temperature lower than said working temperature, the magnetically attractive force therebetween becomes larger than the spring force, so that fluid transfer into storage chamber is completed in a moment. On the contrary, when the ferrite is exposed to a temperature higher than the selected temperature, the attractive force becomes lower than the spring force, so that fluid transfer into torque transmission chamber is effected instantaneously.

3 Claims, 6 Drawing Figures

TEMPERATURE SENSITIVELY ACTUATED HYDRAULIC COUPLING FOR DRIVING FANS

DETAILED EXPLANATION OF THE INVENTION

This invention relates to an improved hydraulic coupling which is capable of controlling hydraulic connnection by sensing the ambient temperature.

Conventional hydraulic coupling is in general provided with sensing element consisting of bimetal or wax at central part of cover outside and controls the hydraulic connection by means of sensing action of the temperature sensing element corresponding to the ambient temperature. In this type of hydraulic coupling, a noise is unavoidabely generated due to hunting phenomenon which takes place in the process of controlling the hydraulic connection at the working temperature.

By way of an example as shown in the follwoing drawings the present invention will be explained in detail with reference to the drawings, in which FIG. 1 is a front view of a hydraulic coupling according to the present invention.

Figure 6:
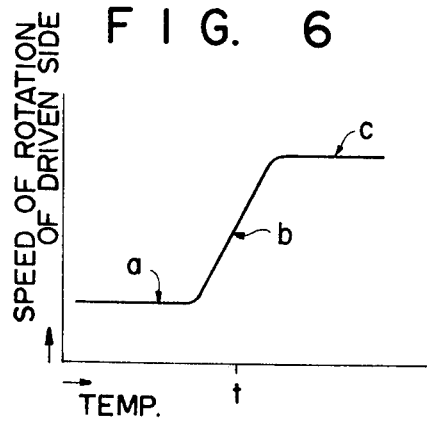
FIG. 6 is a performance curve of a hitherto known coupling.

A relationship between ambient temperature and rotational speed of fan coupled with the conventional hydraulic coupling is shown in FIG. 6, where the ambient temperature is given on the abscissa and the rotational speed on the ordinate. Occurrence of hunting phenomenon will be able to be acknowledged with reference to FIG. 6. Namely the hunting occurs, when the rotational speed changes from line a to line b, and disappears when the speed is increased to line c. Again, the hunting takes place when the speed is changed from the line c to the line b, and disappears when the speed is decreased to the line a. A noise due to such hunting phenomenon can be perceived when the fan is operated at the speed on the line b, where the hydraulic connection is to be controlled.

$t$ shows a predetermined temperature at which the rotational speed of the fan is to be controlled. The present invention provides a hydraulic coupling which is capable of eliminating or minimizing said undersirable noise due to the hunting phenomenon by shifting rapidly the speed of the rotation from the line a to the line c at said predetermined temperature.

Many points of the present invention will be explained with reference to the drawings showing an typical example thereof.

Figure 1:
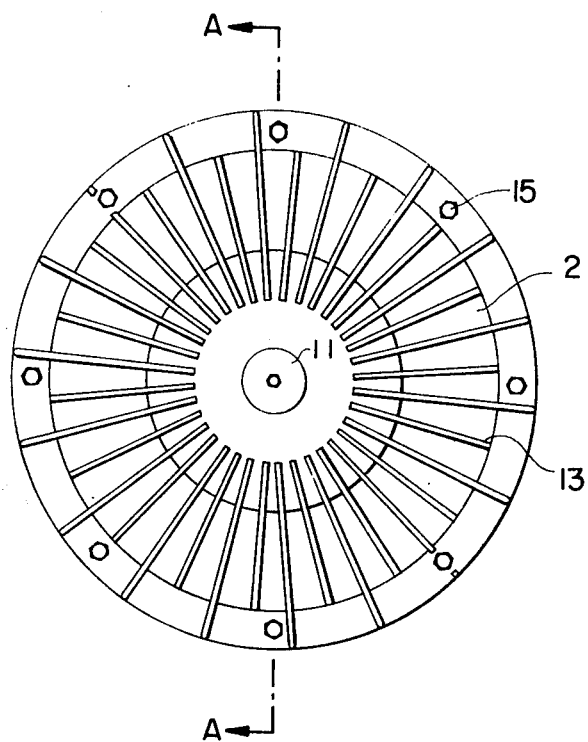
Figure 7:
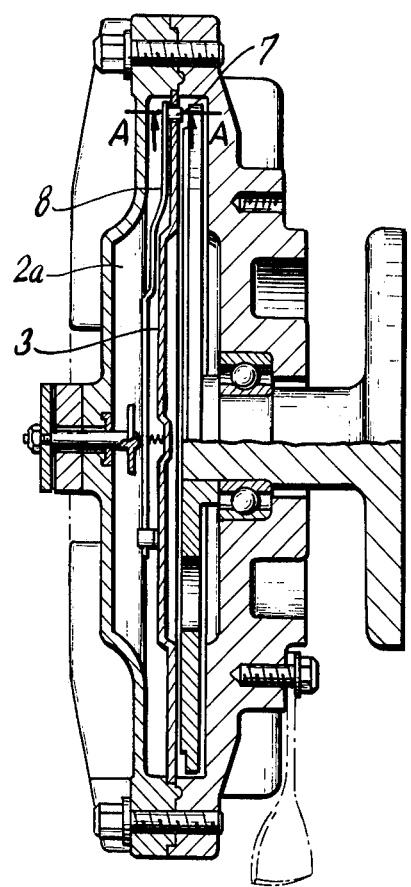
FIG. 7 is an alternate embodiment of the subject invention.
Figure 8:
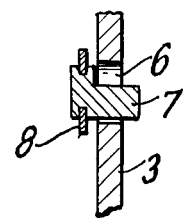
FIG. 8 is an enlarged sectional view along line A —A in FIG. 7.

1 is casing, 2 cover and 3 partition. 1a is torque transmission chamber formed between the casing 1 and the partitiion 3, 2a storage chamber formed between the cover and the partition, and 3a discharge port for supplying the fluid from the storage chamber 2a to the transmission chamber 1a. 4 denotes driving shaft, 4a ball bearing and 4b flange. 5 denotes disc arranged rotatably in the transmission chamber 1a and set fast with shaft 4, 6 fluid inlet, and 6a fluid passage. 7 is dam piece serving to induce the fluid into the fluid inlet 6 by allowing the fluid to run against said dam piece 7. 8 is slender plate built into the storage chamber 2a, and its free end forms valve 8a. The other 8b is set fast to point 8c of the partition 3. Said plate 8 pushes pin 10 at the inner end 10b with an aid of compression spring 9 set between the partition 3 and the plate 8, so that said pin 10 extends through center hole 2b of the cover 2. The pin 10 is provided with stopper 10c at the inner opening of the center hole 2b of the cover. A fluid transfer mechanism is shown to be summarized by m in FIG. 1, said fluid transfer mechanism comprising the following parts, that is, pin 10, slender plate 8, compression spring 9, valve 8a, discharge port 3a, disc 5, dam piece 7 and fluid inlet 6. The fluid transfer mechanism is operated in cooperation with movement of pin 10 during operation of the hydraulic coupling. When the pin 10 is inwardly pushed, the valve 8a is closed and the hydraulic connection is reduced. To the contaray, when the pin 10 moves outward, the valve 8a opens and the hydraulic connection is increased.

the fluid transfer mechanism m isn't limited just to that shown in FIGS. 1–6. In one embodiment as shown in FIGS. 7 and 8 for instance, diameter of the storage chamber 2a is enlarged, passage 6a is removed, slender plate 8 is lengthened, dam piece 7 is set fast on the plate 8 at its free end in such a manner that the dam piece 7 reciprocates in and from said fluid inlet 6. This example is really a hitherto known mechanism, as the mechanism shown in FIGS. 1 - 6 is so, and still belongs to a fluid transfer mechanism $m$ to be covered by the present invention.

The former is typically described in U.S. Pat. No. 3,191,733, and the latter in U.S. Pat. No. 3,179,221.

The fluid transfer mechanism according to the present invention is constructed in the following way so as to perform its function as above mentioned.

Figure 4:
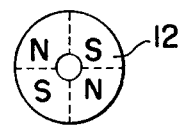
FIG. 4 is a front view of permanent magnet pieces 12.

11 denotes temperature sensitive magnetic material set fast to the extreme end 10a of the pin 10, while 12 is four pieces of permanent magnet fastened to the side wall of the cover 2 and arranged opposite to the inside wall of said temperature sensitive magnetic material 11, said pin 10 extending displaceablly through said magnet 12. The permanent magnet 12 is provided with a through hole 12 a which is aligned with the center hole 2a of the cover so that the pin 10 passes freely therethrough. As shown in FIG. 4, said permanent magnet 12 is arranged in such a manner that N-pole thereof alternates with S-pole annularly. It is obvious, however, that the permanent magnet 12 may be used as single pole.

The temperature sensitive megnetical material 11 comprises Mn-Zn ferrite which is hereinafter refered to as ferrite, while said permanent magnet is also hereinafter refered to as magnet.

Ferrite has a temperature range where magnetic attractive force against magnet is extremely reduced, when the ferrite is exposed to a temperature close to Curie point. Working temperature t of the fluid transfer mechanism is set to said temperature range.

It is to be noted that in case this temperature range is set, the compression spring 9 must be such one that its spring force will be lesser than magnetic attractional force between the ferrite 11 and the magnet 12 when the ambient temperature is lower than a predetermined temperature $t$, the former force will balance with the latter force when the ambient temperature reaches at said predetermined temperature $t$, and the former force will become larger than the latter force when the ambient temperature is higher than said predetermined temperature $t$.

Since the working temperature is set to a temperature range where the magnetic attractive force will abruptly disappear when the ambient temperature around the ferrite exceeds a little bit above said predetermined temperature, as above mentioned, said valve 8a is disconnected far away from said discharge port 3a in a very short time, if the ambient temperature becomes higher than the temperature $t$, while said valve 8a is displaced to close said discharge port 3a in a moment, when the ambient temperature goes down below the predetermined temperature $t$.

It is well known that such Mn-Zn ferrite that has the desired working temperature will be easily obtained by controlling the chemical compositions of components in the ferrite, and that it has a wide range of working temperature between room temperature and 500° C.

Figure 5:
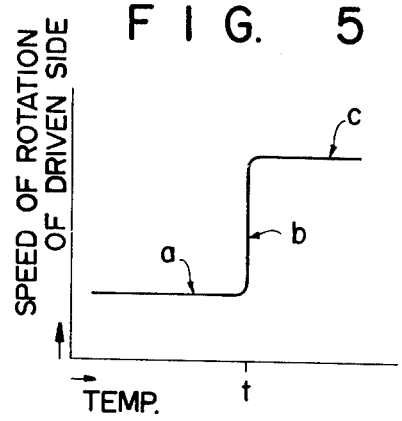
FIG. 5 is a performance curve of the hydraulic coupling according to the present invention.

Resultant effect brought by a fact that the discharge port 3a of the fluid is fully opened or closed in a moment will be acknowledged in FIG. 5, and a difference of the hydraulic coupling according to the present invention from that of the hitherto known type will be recognized by way of a comparison of FIG. 5 with FIG. 6.

Figure 2:
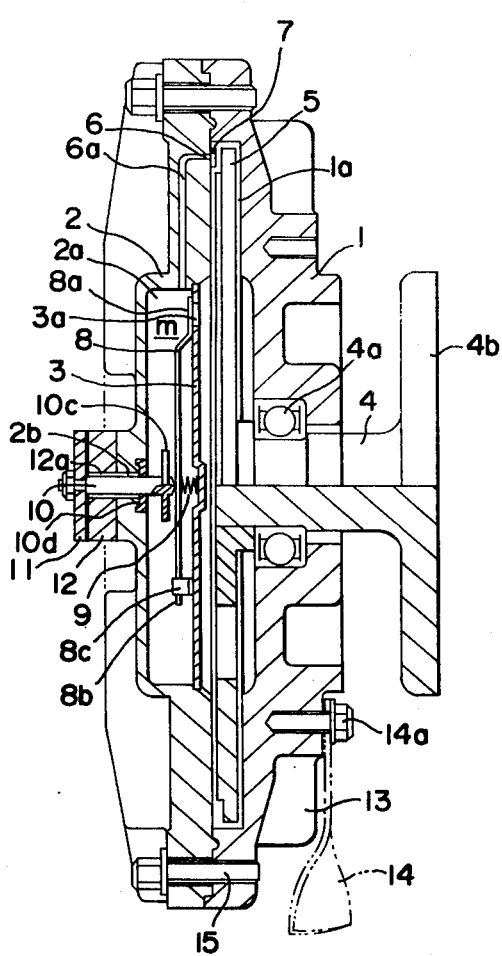
FIG. 2 is an enlarged sectional view taken through line A — A in FIG. 1.
Figure 3:
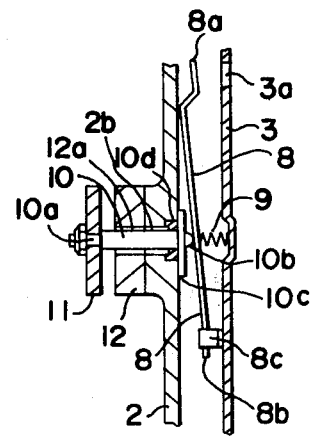
FIG. 3 is an enlarged partial sectional view taken through line A — A in a state different from that shown in FIG. 1.

FIG. 5 is a performance curve of the hydraulic coupling of the invention, and temperature is given on the abscissa and speed of rotation of driven member such as fan fastened to the driven side is on the ordinate. The driven side as refered to above means parts to be rotated together with the cover 2. In FIG. 5 line $a$ corresponds to a temperature range lower than the predetermined temperature, where the ferrite 11 is attracted to the magnet 12 thereby so that the valve 8a is shut down, as shown in FIG. 2, with a result that the hydraulic connection is reduced and thereby numbers of rotation of the driven side is decreased to the minimum. Line $c$ is another temperature range above the predetermined temperature where the ferrite 11 is moved outward away from the magnet 12 so that the valve 8a opens the discharge port 3a, as shown in FIG. 3, resulting in the maximum hydraulic connection. Further line $b$ corresponds to a process of transferring from the line a area to the line $c$ area. A fact that the line $b$ stands upright almost at a right angle to the abscissa at the predetermined temperature will shown that the ferrite 11 is fully disengaged from the magnet 12 instantaneously to allow the valve 8a to open completely the discharge port 3a, causing the hydraulic connection to be increased and strengthened, in the event that the ambient temperature is raised a little bit above the predetermined temperature, and that to the contrary the ferrite 11 is attracted by the magnet 12 in a very short time so that the valve 8a closes the discharge port 3a quickly and thereby the hydraulic connection is abruptly reduced, when the ambient temperature drops very little below the predetermined temperature.

Thus, according to this invention the hydraulic connection can be quickly controlled so that the noise may be eliminated.

By the way, 10d is a seal packing, 13 fins, 14 fan blades, 14a mounting bolts for said fan blade 14 and 15 tightening bolts for the casing 1 and the cover 2.

What is claimed is:

1. Temperature sensitively actuated hydraulic coupling comprising a casing on one side, a cover on the other side, a torque transmission chamber on the casing side, a storage chamber on the cover side, said torque transmission chamber and storage chamber being in communication via a fluid inlet and separated by a partition arranged between the casing and the cover, a pin extending through a hole at the center of the cover, of which inner end comes in contact with a slender plate that is a component of a fluid transfer mechanism, and a compression spring acting against said pin at its end through said slender plate, and a fluid transfer mechanism so constructed that hydraulic coupling is increased by outward movement of said pin, while it is decreased by inward movement thereof characterized in that a permanent magnet having a through hole aligned with a center hole of the cover is provided on the outer side wall of the cover and a temperature sensitive magnetic element is fastened to the outer end of said pin, said temperature sensitive magnetic element consisting of Mn-Zn ferrite having a property that the magnetic attractive force between said temperature sensitive magnetic element and said permanent magnet is quickly reduced at a predetermined temperature where the hydraulic coupling is controlled, said temperature sensitive magnetic element being located opposite to said permanent magnet whereby as said temperature sensitive magnetic element senses higher temperature than said working temperature, the magnetic attractive force becomes decreased lower than the counter force by the spring and thereby said temperature sensitive magnetic element is moved away from the permanent magnet in a moment, while as said temperature sensitive magnetic element senses a temperature lower than said working temperature, said attractive force overcomes the spring force and thereby the ferrite is magnetically attracted by the magnet quickly, and thus in the former case, said pin is moved outward instantaneously to increase the hydraulic coupling, while in the latter case, said pin is moved inward instantaneously to decrease the hydraulic coupling.

2. Temperature sensitively actuated hydraulic coupling as set forth in claim 1, wherein the fluid transfer mechanism is constructed to control the fluid transferring in such a way that a dam piece is provided adjacent to an inlet of the fluid inlet and the slender plate is provided with a valve at its free end to open or close said fluid inlet for supplying the fluid from the storage chamber to the transmission chamber.

3. Temperature sensitively actuated hydraulic coupling as set forth in claim 1 wherein the fluid transfer mechanism is constructed to control the fluid transferring in such a way that the dam piece is set fast onto the free end of the slender plate so that said dam piece reciprocates to and from the fluid inlet.

* * * * *